Patented June 8, 1926.

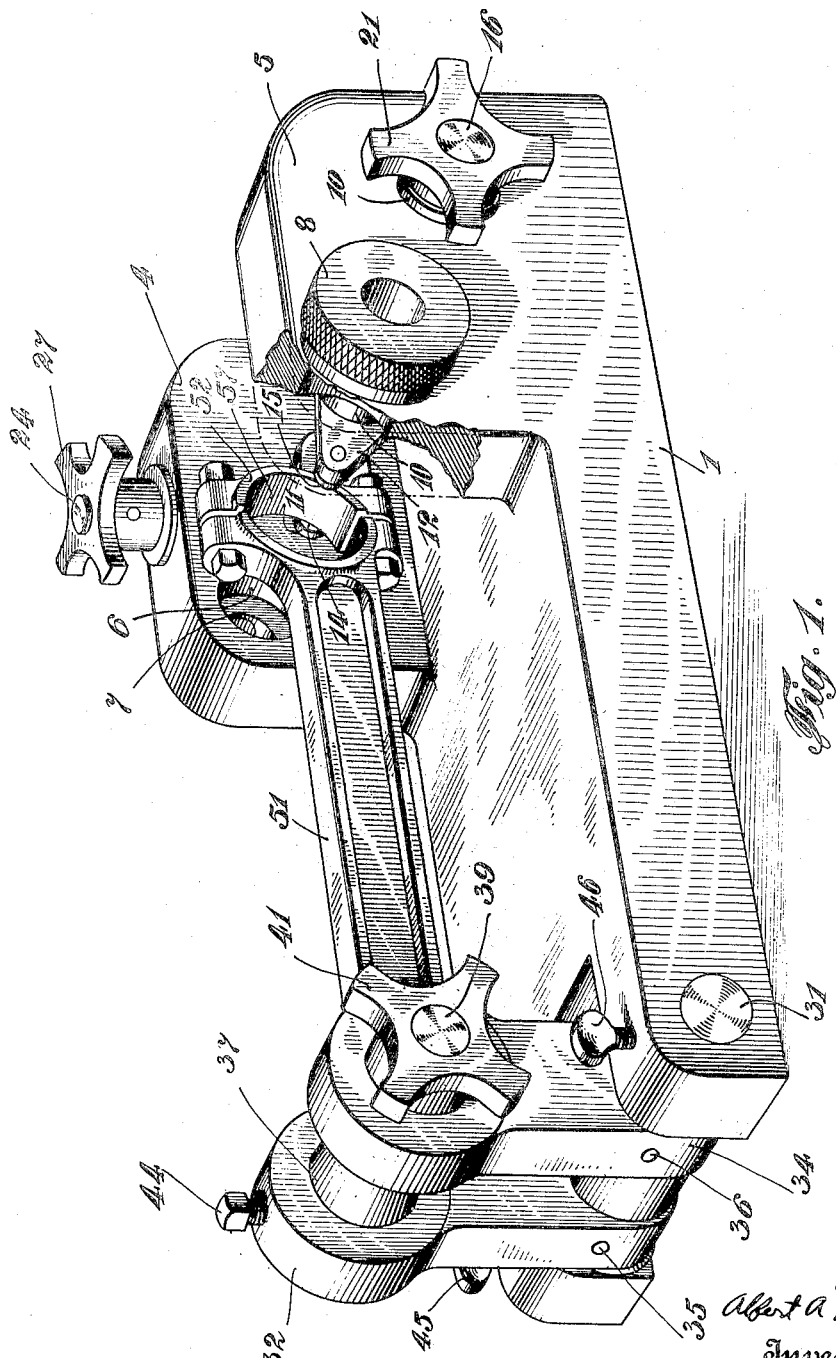

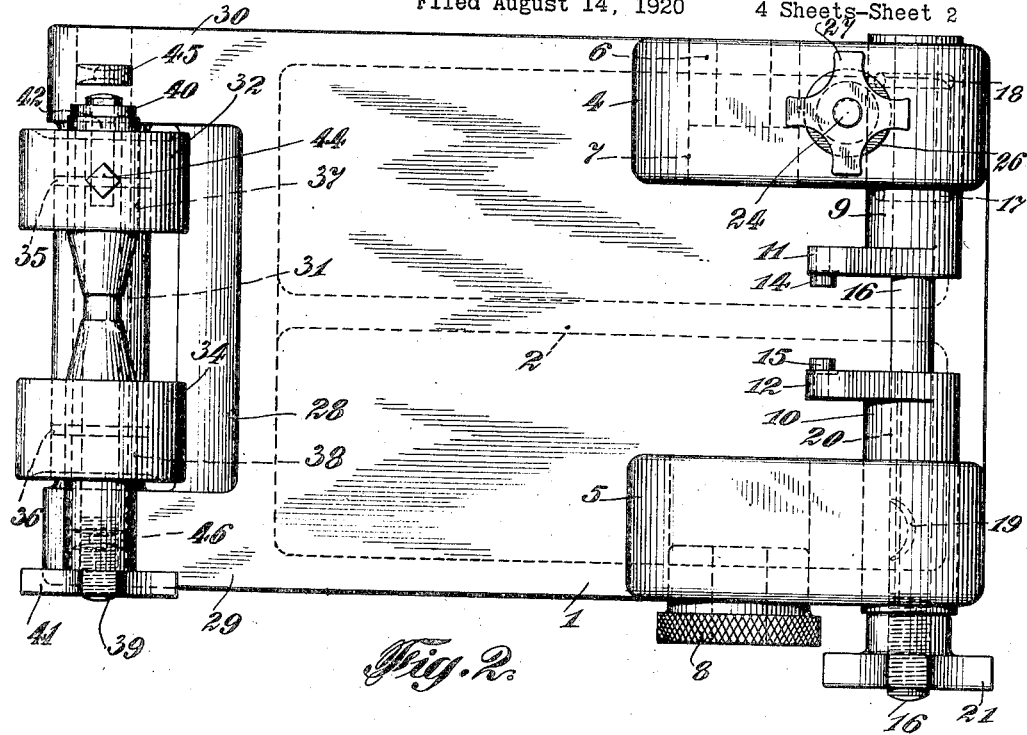
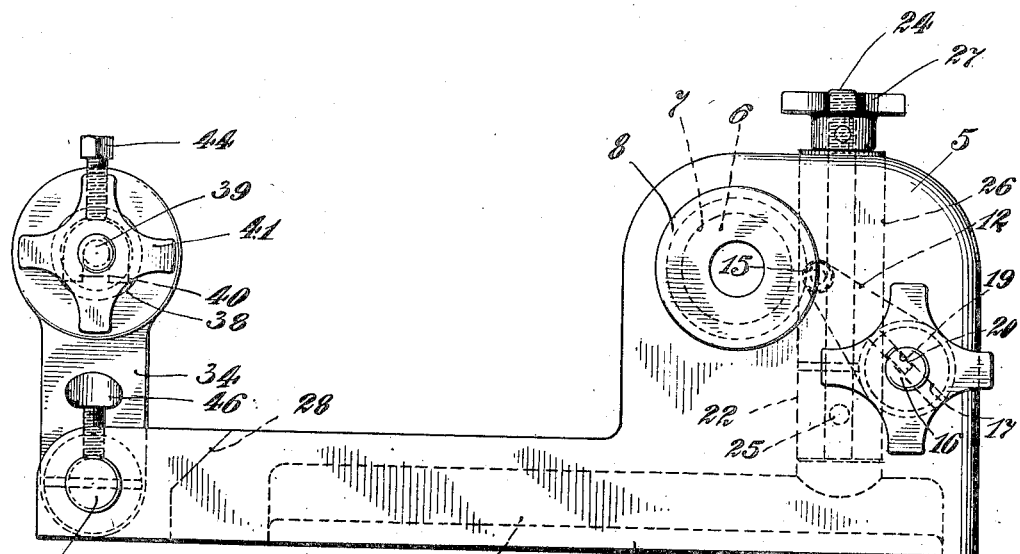

1,587,666

UNITED STATES PATENT OFFICE.

ALBERT A. MARTELL, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

METHOD AND APPARATUS FOR ALIGNING CONNECTING-ROD BEARINGS.

Application filed August 14, 1920. Serial No. 403,579.

This invention relates broadly to a method and apparatus for aligning bearings and more particularly to an improvement on the invention disclosed in my Patent No. 1,269,833 granted June 13, 1918.

The principal object of the present invention is the method, and also an apparatus by which the method may be carried out, for aligning the bearings in the ends of connecting rods and the like by supporting one end of the connecting rod by means of an accurately finished bearing surface therein, clamping the other end of the connecting rod without stressing the rod longitudinally, and then finishing the bearing adjacent the clamped end of the rod.

A further object of the present invention is the maintenance of the axis of a finished bearing at one end of the rod parallel to the axis to which the bearing at the other end of the rod is to be formed, and finishing the latter bearing without stressing the rod in the direction of its length.

Another object of the present invention is to provide a method and apparatus for finishing connecting rod bearings wherein the connecting rod is supported in such manner as to be capable of adjustments relative to the fixed axis of a reamer in such manner that said connecting rod may be positioned with the fixed axis of the reamer parallel to the axis of a finished bearing in the end of the connecting rod opposite to the bearing adapted to be finished by the reamer and then finishing the latter bearing.

A still further object of the present invention is a method and apparatus for finishing connecting rod bearings and wherein the connecting rod is adapted to be supported by lateral pressure adjacent the opposite ends thereof in such manner that the axis of a finished bearing in one end of the connecting rod is maintained parallel to the fixed axis of a reamer adapted to be used to finish the bearing in the opposite end of the connecting rod.

Other and further objects of the present invention will in part be obvious and will in part be pointed out hereinafter by reference to the accompanying drawings forming a part of this application and wherein like parts are represented by like characters throughout the several figures thereof.

Realizing that the present invention may be embodied in structures other than those specifically disclosed herewith, it is to be understood that the present disclosure is illustrative and is not to be taken in the limiting sense.

Figure 1 is a perspective view of one form of apparatus for carrying out the present invention and illustrates a connecting rod in position to be reamed and before the reamer is in place;

Figure 2 is a plan view of the device illustrated in Figure 1;

Figure 3 is an elevational view of the device illustrated in Figure 2;

Figure 4:
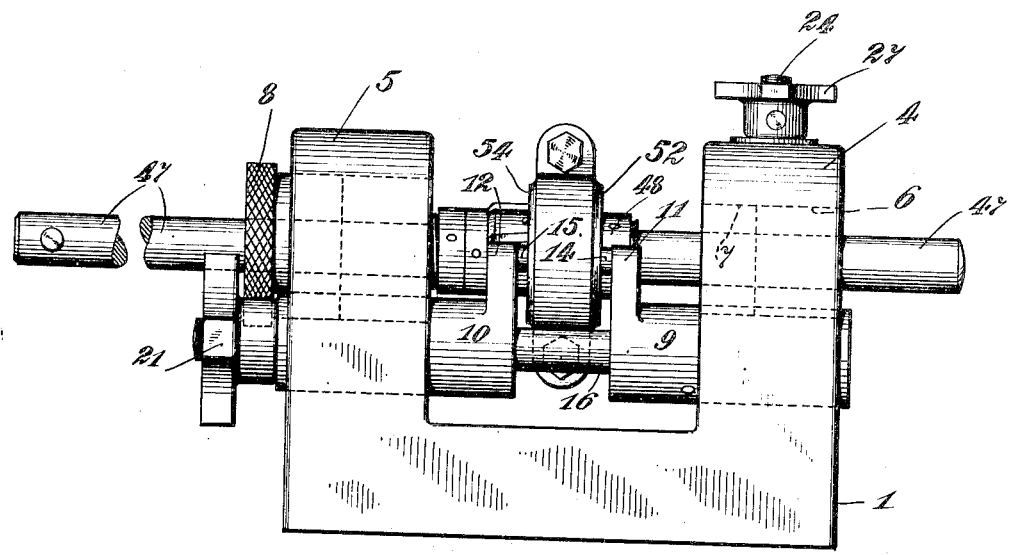
Figure 4 is an end view showing the head of the device with a connecting rod in position and the reaming operation partly completed.
Figure 5:
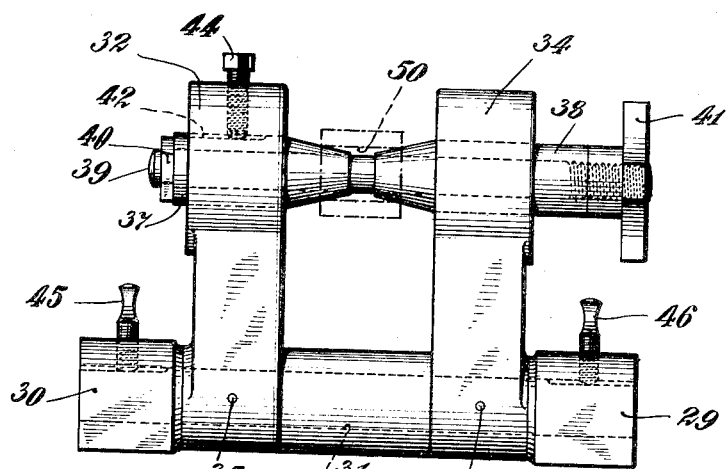
Figure 5 is a view of the opposite end of the device illustrating the construction for supporting one end of the connecting rod.
Figure 6:
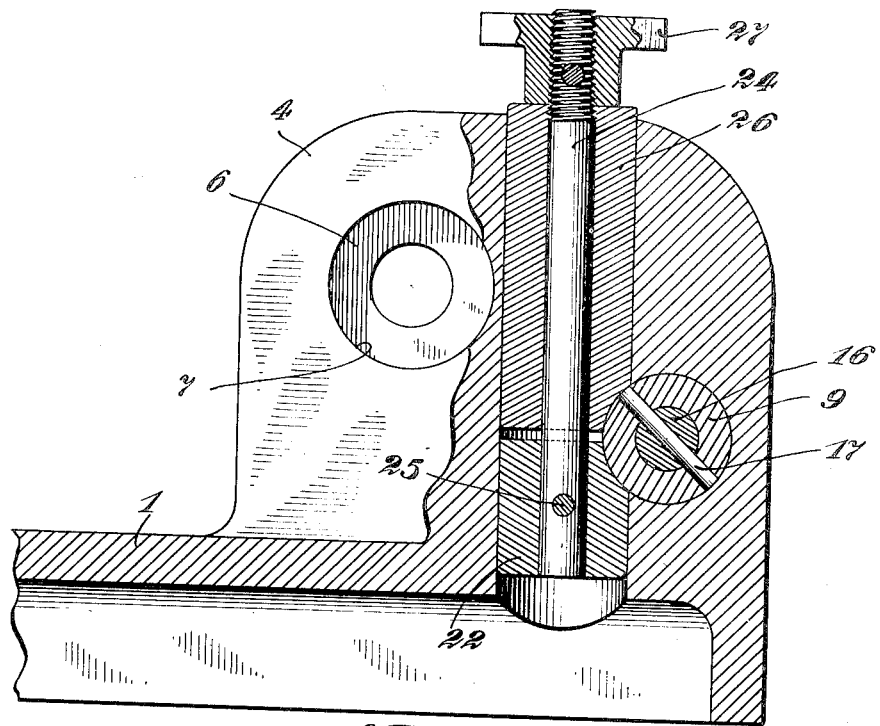
Figure 6 is a detail view of the mechanism for locking the vise clamp jaws.

In the hydrocarbon engine art it has been found particularly desirable that the axes of the connecting rod bearings shall be exactly parallel. If the axes are not parallel the stresses established in the structure when an explosion occurs causes side thrusts which result in the piston being forcibly driven against one side of the cylinder wall, thereby causing a "knock" due to "slap" of the piston. Also uneven stresses are established on the connecting rod bearings and the general result is bad.

The present invention provides a method and apparatus wherein connecting rod bearings may be quickly and economically finished with a positive assurance that the bearings in both ends of the connecting rod have axes which are parallel. In repair work on hydrocarbon engines it is frequently necessary to refinish the connecting rod bearings and the present invention is adapted for repair work as well as production. In repair work it is particularly desirable that various conditions may be taken care of since different and all kinds of engines must be repaired, therefore, the present invention provides a construction wherein connecting rods of varying lengths may be accommodated and refinished without undue manipulation of the device to receive such connecting rods.

The present invention contemplates finishing the bearing in the small end of the connecting rod and then supporting this bearing by means of suitable members inserted in the finished bearing so that the axis of this bearing is fixed relative to a suitable frame or fixture. Preferably the supporting members are conical so that the adjustment is automatically accomplished. This frame or fixture preferably is of heavy rigid construction and is provided with guides for a suitable reamer with the axis of the reamer parallel to the axis of the support. Provision is also made for securely clamping the crank shaft bearing end of the connecting rod in position to receive the reamer and without establishing any side or longitudinal stress upon the connecting rod. When the rod is so positioned the reamer is operated to finish the crank shaft bearing of the connecting rod and when the bearing is so finished the axis of the finished bearing will be parallel to the axis of the bearing in the other end of the connecting rod.

Referring now to the drawings, the base 1 is of relatively heavy metal provided with recesses on the under side and having a rib 2 extending longitudinally of the center. The head end of the base is provided with a pair of upstanding wings 4 and 5 which are of heavy metal and preferably integral with the base. The wing 4 is bored to receive a hardened bushing 6 which is fixedly secured in place and constitutes a guide for the forward end of the reamer shaft. A recess 7 is provided adjacent bushing 6 and is adapted to receive such portion of the reamer as may extend through the connecting rod which is being finished. The wing 5 is likewise bored directly opposite to the bushing 6 and is adapted to carry a removable bushing 8. The removable bushing 8 preferably is slipped over the reamer shaft prior to the securing to the reamer thereon so that each particular reamer used preferably carries its own bushing 8. It being understood that in repair work different sized reamers will be required for different connecting rods. The bushing 8 is of a less length than the thickness of the wing 5 so that a recess is provided adjacent the end of the bushing 8 to constitute clearance to receive the reamer at the beginning of the operation. The two bushings 6 and 8 constitute accurately fitted bearings for the reamer shaft and when in position in the wings 4 and 5 the axes of these bushings are accurately aligned to be at substantially right angles to the middle of the longitudinal axis of the base 1.

Both the wings 4 and 5 slightly below and forward of the bushing openings are bored to receive the clamping mechanism which comprises a pair of vise sleeves 9 and 10 each of which is provided with off-set vise jaws 11 and 12. These vise jaws are provided on their tips with hardened buttons 14 and 15. The vise sleeves 9 and 10 are mounted upon a shaft 16. The sleeve 9 is fixedly secured to the shaft 16 by means of the pins 17 and 18 and the sleeve 10 is slidable on the shaft 16 but is prevented from rotating relatively thereto by the key 19 which slides in a keyway 20 cut in the sleeve 10. The end of the shaft 16 adjacent the outer end of the vise sleeve 10 is screw threaded and carries a screw threaded hand wheel 21 which when turned down on the screw threads draws the vise clamp sleeves together. The wing 4 is provided with a vertical bore substantially at right angles to and intersecting with the bore in which the sleeve 9 is carried. A clamping post is accurately fitted into this vertical bore and comprises a clamp sleeve 22 which is rigidly secured to a stub shaft 24 by means of a trough pin 25. A sliding sleeve 26 slides over the stub shaft 24 above the clamp sleeve 22. Both the clamp sleeve 22 and the sliding sleeve 26 are provided with portions of cylindrical surfaces adjacent the meeting ends of these sleeves, which cylindrical surfaces are adapted to form clamping jaws that seat on the vise sleeve 9. The upper end of the stub shaft 24 is screw threaded and carries the hand nut 27 which, when tightened down on the screw threads, draws the clamping sleeve and the sliding sleeve together, thereby securely clamping the vise sleeve 9 against rotation or longitudinal movement in the wing 4.

The end of the base opposite to the wings 4 and 5 is cut away as at 28 to provide lugs 29 and 30. A supporting shaft 31 extends through the lugs 29 and 30 and carries a pair of upstanding arms 32 and 34. These arms are rigidly secured to the supporting shaft 31 by means of drive pins 35 and 36. The arms 32 and 34 are bored and carry supporting sleeves 37 and 38. A clamp shaft 39 extends through the supporting sleeves 37 and 38 and is provided on one end with a pair of opposed parallel recesses which receive the wings of a C-washer 40 which forms a removable abutment which normally prevents the clamp shaft 39 from drawing through the supporting sleeve 37 but which may be removed when it is desirable to remove the clamp shaft 39. The opposite end of the clamp shaft 39 is screw threaded and is provided with a hand clamp nut 41. The supporting sleeve 37 is flatted as at 42 and a stub screw 44 is adapted to be seated on the flat portion to prevent rotation of the sleeve 37. Wing thumb screws 45 and 46 are provided to form friction members adapted to restrict the freedom of rotation of the supporting shaft 31.

Figure 7:
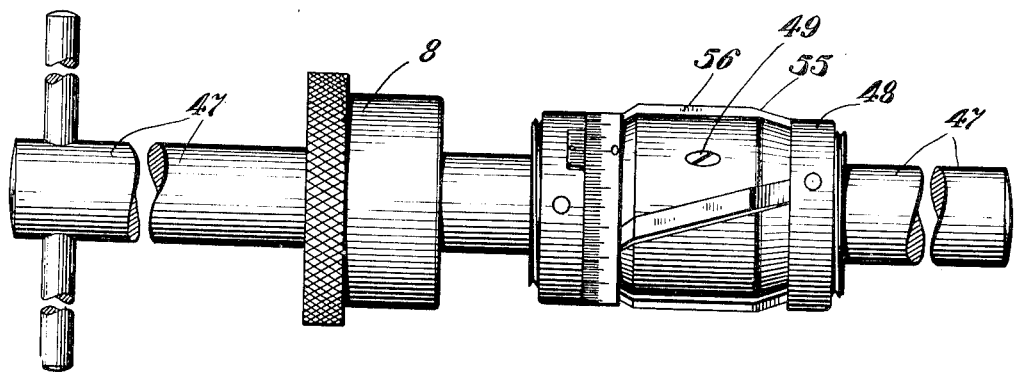
Figure 7 is a detail view of the reamer and shaft.

Referring more specially to Figure 7, the reaming mechanism may comprise a reamer shaft 47 upon which may be threaded a removable bushing 8, and an adjustable reamer 48 which is fixedly held in position on the shaft by means of the clamp screw 49.

In carrying out the method of finishing connecting rod bearings with the apparatus described, the C-washer 40 is removed from the clamp shaft 39 and the shaft, together with the supporting sleeve 38, is removed. The bearing 50 in a suitable connecting rod 51 is accurately reamed to fit the piston wrist pin in which the connecting rod is adapted to be used. This connecting rod is then positioned upon the conical surface on the supporting sleeve 37 and the clamp shaft 39, together with the supporting sleeve 38, are repositioned in such manner that said bearing 50 is now supported upon the conical surfaces on both the sleeves 37 and 38 and the C-washer is replaced in position upon the clamp shaft. The hand nut 41 is carefully operated to secure and clamp the bearing 50 in position upon the said conical surfaces. When this is done it will be found that the connecting rod will be rigidly and securely held in position without lateral play or movement, but is capable of slight rotative movement around the axis of the conical surfaces of the supporting sleeves 37 and 38. The crank shaft bearing end of the connecting rod has been provided with machined side surfaces 52 and 54 and this bearing is swung over into substantially the desired position between the wings 4 and 5. The hand nut 27 on the vise sleeve 9 is loosened and hand wheel 21 is rotated until the button 14 makes contact with the finished surface 52. The hand nut 27 is then lightly clamped and the hand wheel 21 is further operated until the button 15 on the clamp jaw 12 engages with the surface 54. The hand nut 27 is again loosened and the thumb screws 45 and 46 are loosened. The reamer shaft 47 is inserted through the openings in the wings 4 and 5 and through the bushing 6. The bushing 8 is then carefully fitted into the opening in the wing 5 with the cutting angles 55 on the reamer blades 56 touching on all sides with the crank shaft bearing 57 on the connecting rod 51. The loosening of the thumb nuts 45 and 46 and of the clamp sleeve hand nut 27 permits slight movement in two directions of the crank shaft bearing 57 in order that the same may be accurately engaged with the cutting angles 55 of the reamer blades. When this engagement is established thumb nuts 45 and 46 and the hand nuts 27 are tightened so that the parts are now rigidly and accurately locked and, since the axis of the clamp shaft 39, which is coincident with the supporting sleeves 37 and 38, is exactly parallel to the axis of the reamer shaft when in its bearings 6 and 8, it follows that the axis to which the crank shaft bearing 57 will be reamed is exactly parallel to the axis to which the bearing 50 has been finished.

In production work, where the length of the connecting rods are substantially identical, it is not necessary to release the thumb nuts 45 and 46 or the hand nut on the locking sleeves 27 between operations when the device is being used on substantially identical connecting rods. Under these circumstances it is only necessary to operate the supporting sleeve 38, clamp shaft 39 and connected parts, and the vise jaw operating mechanism comprising the hand wheel 21.

The foregoing described method and apparatus provides an exceedingly simple, accurate and efficient way for securing the extreme accuracy of parallelism between the axis of crank shafts which modern engine practice demands.

Having thus described my invention, what I claim is:

1. The method of aligning connecting rod bearings and the like, which method comprises finishing the wrist pin bearing, mounting said wrist pin bearing upon a movable support in such manner as to permit rotative movement of the connecting rod around the axis of the wrist pin bearing and preventing any movement of said connecting rod at right angles to said axis, providing an abutment adapted to contact with one side of the connecting rod adjacent the crank shaft bearing end, guiding a reamer with its axis parallel to the axis of the wrist pin bearing, adjusting said crank shaft bearing about the axis of said wrist pin bearing in such manner that the axis thereof is approximately coincident with the axis of said reamer, clamping the crank shaft bearing end of the connecting rod tightly against said abutment, and then reaming said crank shaft bearing.

2. The method of aligning connecting rod bearings and the like, which method comprises finishing the wrist pin bearing, finishing the sides of the connecting rod adjacent the crank shaft bearing with said sides parallel, mounting said wrist pin bearing upon a movable support in such manner as to permit rotative movement of the connecting rod around the axis of the wrist pin bearing and preventing any movement of said connecting rod at right angles to said axis, providing an abutment adapted to contact with one side of the connecting rod adjacent the crank shaft bearing end, guiding a reamer with its axis parallel to the axis of the wrist pin bearing, adjusting said crank shaft bearing in such manner that the axis thereof is approximately coincident with the axis of said reamer, clamping the crank shaft bearing end of the connecting rod tightly against said abutment, and then reaming said crank shaft bearing.

3. A device for reaming connecting rod bearings and the like comprising a bed portion, a pair of wings extending from said bed portion, slidable members adapted to laterally clamp a connecting rod, bearings for a reamer shaft carried by said wings, a pair of swinging arms at the other end of said bed portion, and conical members carried by said swinging arms for supporting a connecting rod bearing.

4. A device for reaming connecting rod bearings and the like comprising a bed portion, a pair of rigid wings connected to said bed portion, clamping members slidably and rotatably mounted in said wings and adapted to be relatively movable to each other and also relatively movable to said wing members, a swinging support adapted to support one end of a connecting rod by means of the bearing therein, and reamer shaft bearings carried by said wings adjacent said clamps.

5. A device for reaming connecting rods and the like comprising a bed portion, swinging arms, a conical support carried by the swinging arms, a pair of vise jaws relatively movable one to the other and slidably and rotatably movable relative to said body portion, and means for locking said jaws against rotative or slidable movement.

6. The method of aligning connecting rod bearings and the like which method comprises finishing the wrist pin bearing, finishing the side of the connecting rod adjacent the crank shaft bearing, mounting said wrist pin bearing on a swinging support to permit rotatable adjustment thereof, laterally supporting the crank shaft bearing end by a pair of abutments likewise rotatably adjustable, guiding a reamer with its axis parallel to the axis of the wrist pin bearing, positioning said connecting rod by rotating said swinging support and said abutments until the axis of the crank shaft bearing is substantially coincident with the axis of the reamer, and then reaming said crank shaft bearing.

7. The method of aligning connecting rod bearings and the like which method comprises mounting a wrist pin bearing on a swinging support to permit rotatable adjustment thereof, laterally supporting the crank shaft bearing end by a pair of abutments without creating longitudinal stress in said connecting rod, guiding a reamer with its axis parallel to the axis of the wrist pin bearing, positioning said connecting rod by rotating said swinging support until the axis of the crank shaft bearing is substantially coincident with the axis of the reamer, clamping said swinging support and said abutments to hold said rod in position, then reaming said crank shaft bearing.

8. A device for reaming connecting rod bearings and the like comprising a bed portion, a pair of wings extending from said bed portion, slidable members mounted in said wings and adapted to clamp laterally a connecting rod, bearings for the reamer shaft carried by said wings, a pair of swinging arms on the other end of said bed portion, conical members carried by said swinging arms for supporting a connecting rod bearing, and means for rigidly clamping said swinging arms in a predetermined position.

9. A device for reaming connecting rod bearings and the like comprising a bed portion, a shaft rotatably mounted at one end of said bed portion, a pair of swinging arms rigidly mounted on said shaft, clamp members on said arms adapted to engage and support the wrist pin bearing of a connecting rod, a pair of wings on the other end of said bed portion, clamp members mounted between said wings and adapted to engage laterally and support the crank shaft end of a connecting rod, bearings in said wings, and a reamer in said bearings having its axis parallel to said shaft at the other end of said bed plate.

10. A device for reaming connecting rod bearings and the like comprising a bed portion, a shaft rotatably mounted at one end of said bed portion, a pair of swinging arms rigidly mounted on said shaft, clamp members adapted to engage and support the wrist pin bearing of a connecting rod, a pair of wings on the other end of said bed plate, clamp members mounted between said wings and adapted to engage laterally and support the crank shaft end of a connecting rod, bearings in said wings, a reamer in said bearings having its axis parallel to said shaft at the other end of said bed portion, and means for simultaneously adjusting the position of said swinging arms and said clamp members about their respective axes, to position the crank shaft bearing of a connecting rod for the reaming operation.

11. A device for reaming connecting rod bearings and the like comprising a bed portion, an adjustable support at one end thereof for the wrist pin end of a connecting rod, a pair of wings at the other end of said bed portion, a shaft mounted in said wings, sleeves rotatably mounted on said shaft carrying a pair of rotatable off-set clamping abutments, a reamer mounted in said wings adjacent said abutments, means for bringing said rotatable abutments in engagement with the crank shaft end of said connecting rod to support it laterally by pressure exerted in a direction parallel to said reamer shaft, and set screws for locking said abutments against rotation when said connecting rod is in position for reaming.

12. A device for reaming connecting rod bearings and the like comprising a supporting base; a swinging arm pivoted at one end of said base; means to pivotally secure the wrist pin end of a connecting rod to said swinging arm at a point eccentric of the pivot of said arm, whereby the connecting rod may be adjusted longitudinally by the swing of the arm; clamping means adapted to hold the crank shaft end of the connecting rod by pressure applied immediately adjacent the bearing surface to be reamed and in a direction substantially parallel to the axis of the bearing to be reamed; and means to guide a reamer through the crank shaft bearing of the connecting rod.

ALBERT A. MARTELL.